Figure 1:
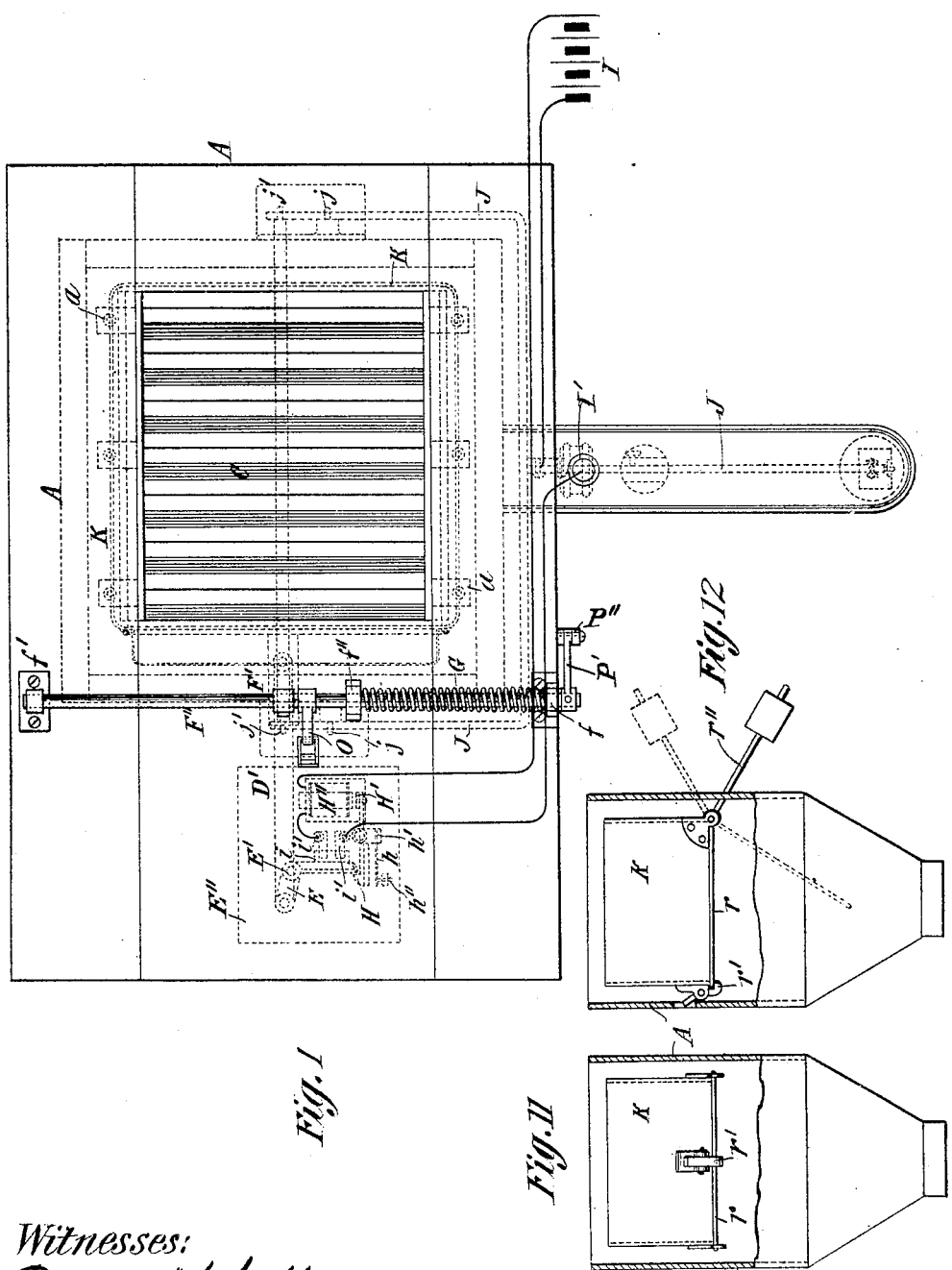

No. 637,388. Patented Nov. 21, 1899.
E. HANAK.
AUTOMATIC WEIGHING SCALE.
(Application filed June 13, 1898.)
(No Model.) 5 Sheets—Sheet 2.

Witnesses:
Raphaël Netter
Benjamin Miller

Edward Hanak, Inventor
by Kerr, Curtis & Page, Attys.

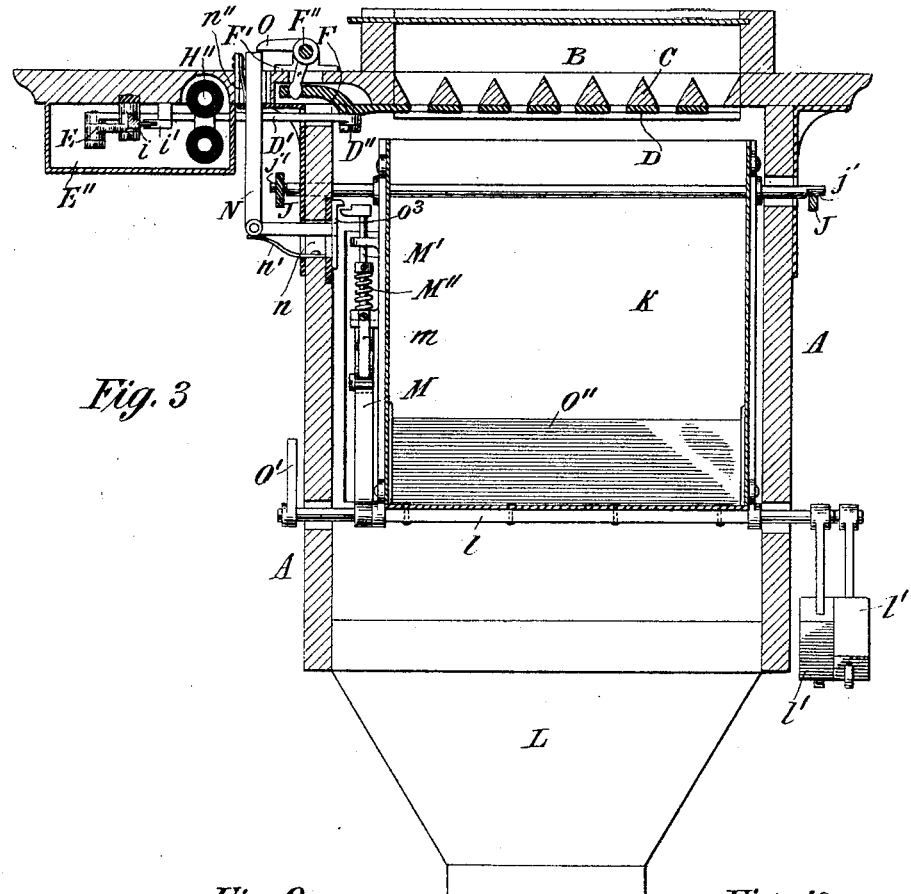
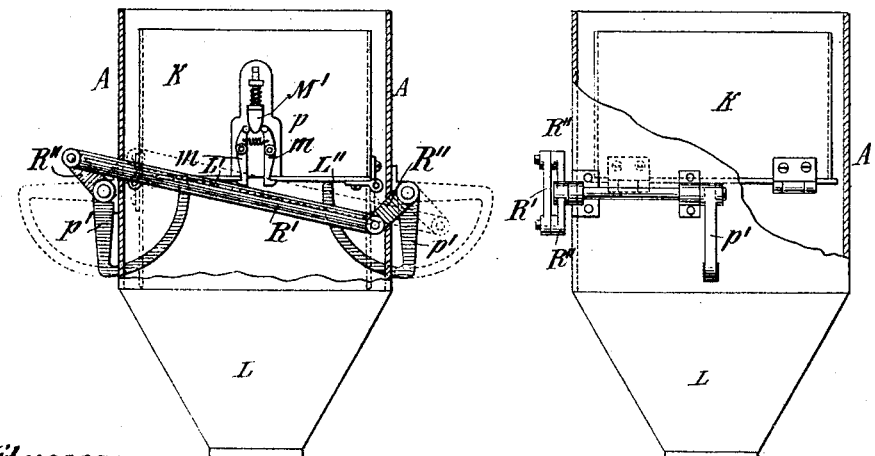

No. 637,388. Patented Nov. 21, 1899.
E. HANAK.
AUTOMATIC WEIGHING SCALE.
(Application filed June 13, 1898.)
(No Model.) 5 Sheets—Sheet 4.
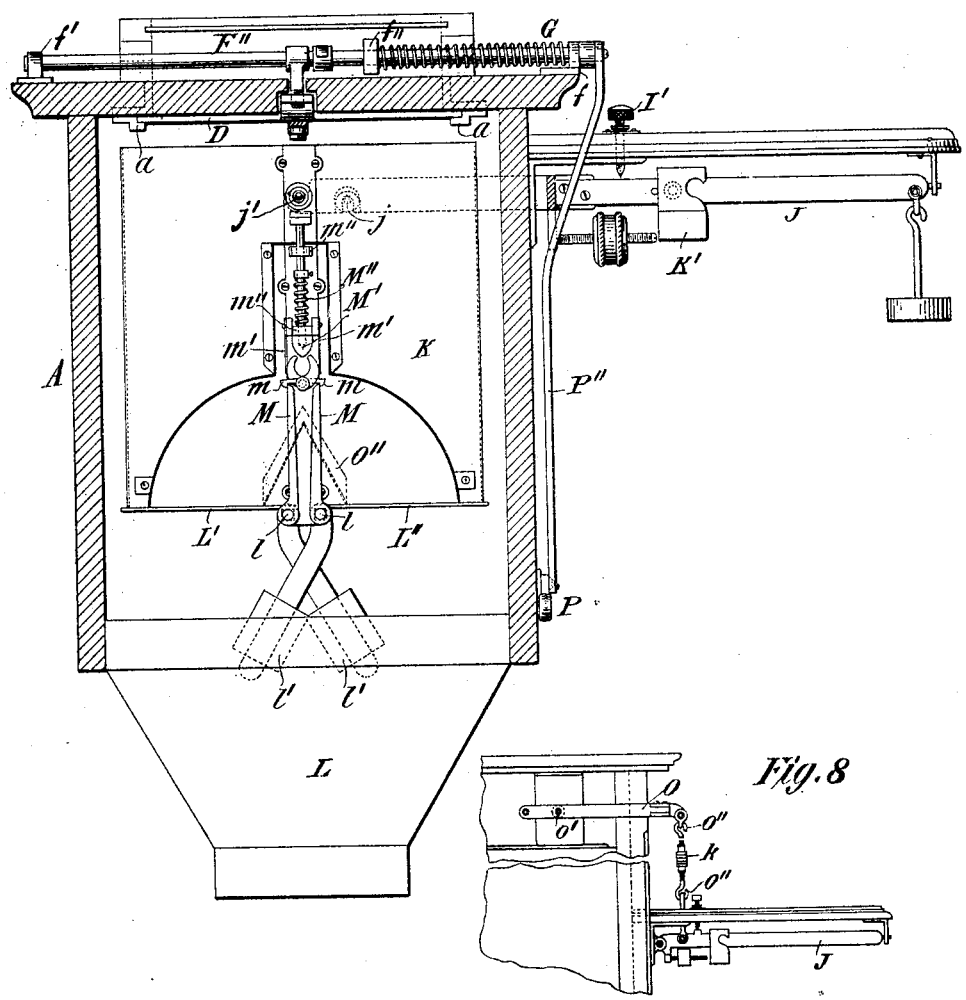
Witnesses:
Raphaël Netter
Benjamin Miller
Edward Hanak, Inventor
by Kerr, Curtis & Page, Attys.

No. 637,388. Patented Nov. 21, 1899.
E. HANAK.
AUTOMATIC WEIGHING SCALE.
(Application filed June 13, 1898.)

(No Model.) 5 Sheets—Sheet 5.

Witnesses:
Raphaël Netter
Benjamin Muller

Edward Hanak, Inventor
by Kerr, Curtis & Page, Attys

UNITED STATES PATENT OFFICE.

EDWARD HANAK, OF SACRAMENTO, CALIFORNIA, ASSIGNOR TO THE UNION SCALE AND MANUFACTURING COMPANY, OF SAME PLACE.

AUTOMATIC WEIGHING-SCALE.

SPECIFICATION forming part of Letters Patent No. 637,388, dated November 21, 1899.

Application filed June 13, 1898. Serial No. 683,323. (No model.)

*To all whom it may concern:*

Be it known that I, EDWARD HANAK, residing at Sacramento, in the county of Sacramento and State of California, have invented certain new and useful Improvements in Automatic Weighing-Machines, of which the following is a specification, reference being had to the drawings accompanying and forming a part of the same.

The invention, the subject of my present application for Letters Patent, is an improvement in automatic weighing apparatus of the general class to which the machine described and shown in my Patent No. 594,008, dated November 23, 1897, pertains.

The present improvements have mainly for their objects to simplify the apparatus, to improve its operation, and to provide means by which granular and powdered substances may be more easily and economically weighed off in given quantities than by the devices heretofore employed.

In the drawings hereto annexed I have illustrated my improved apparatus in the form which I have found best adapted for practical use and also certain modifications of the same which are or may be used when occasion requires.

Figure 2:
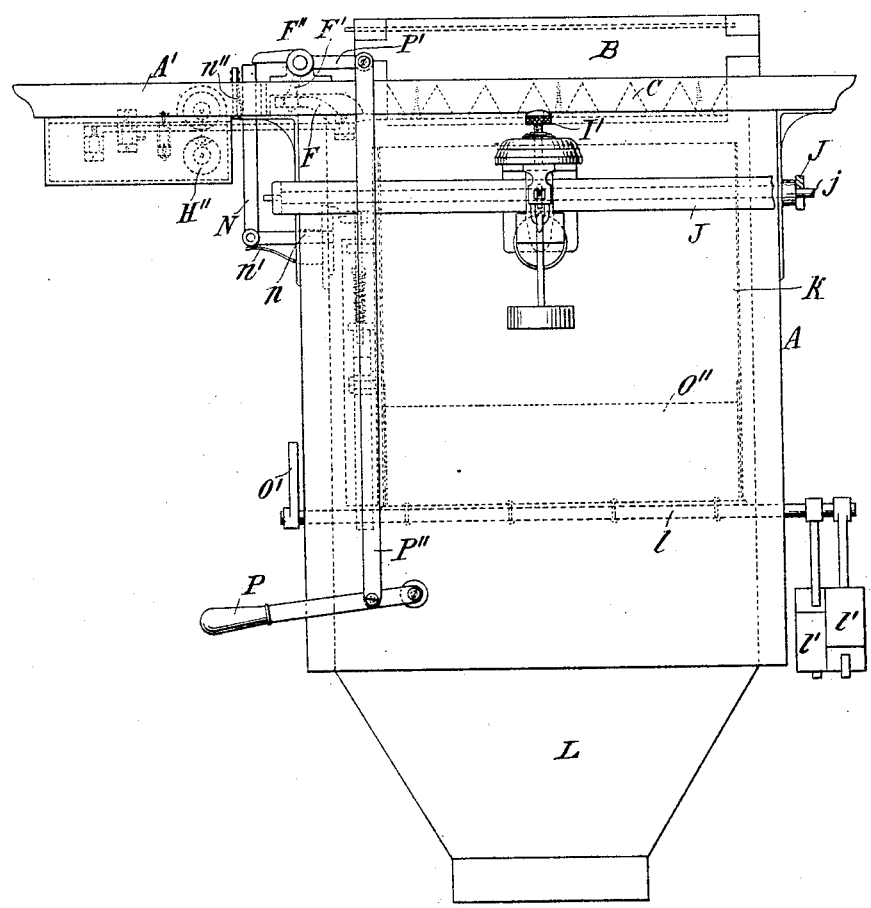
Figure 5:
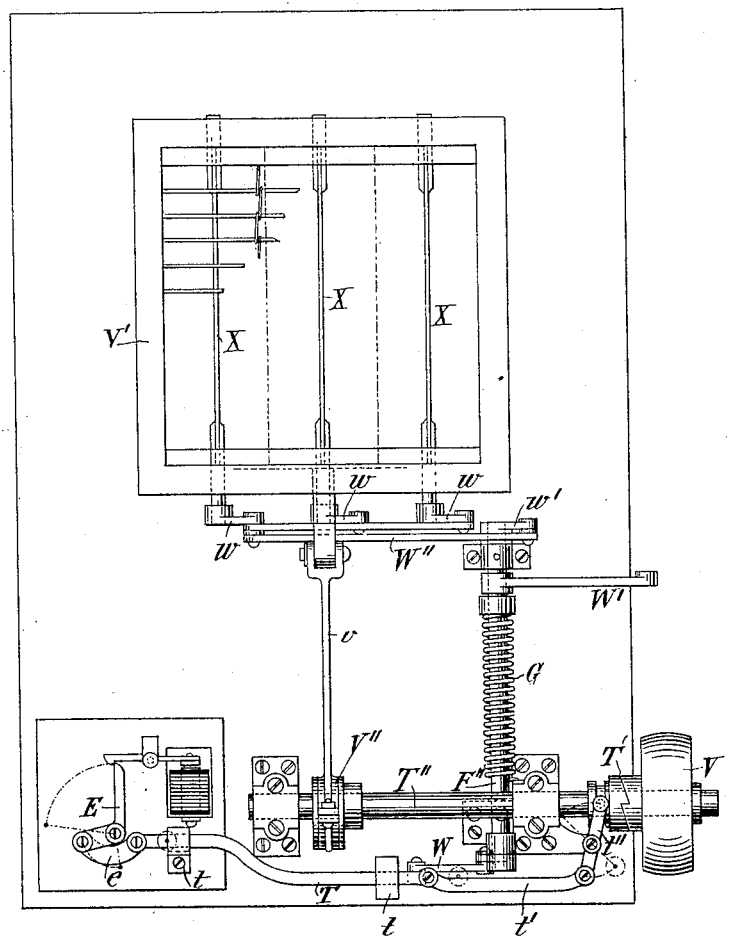
Figure 7:
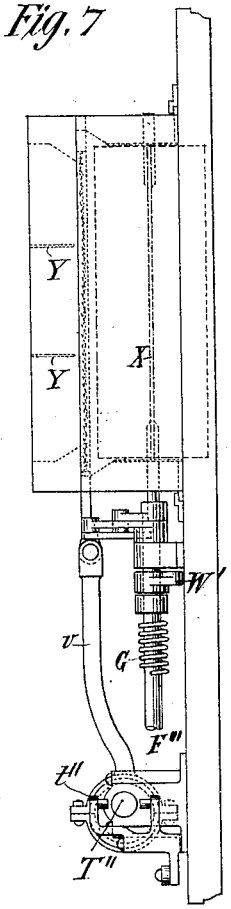
Figure 6:
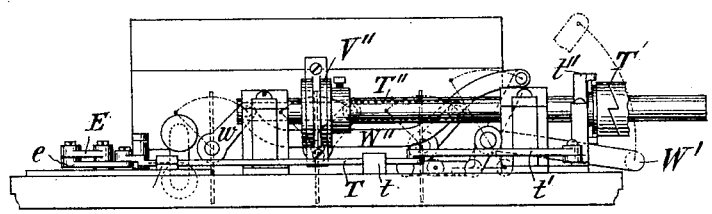

Figure 1 is a top plan view of the apparatus. Fig. 2 is a side view of the same with portions of the outer box or casing removed. Fig. 3 is a central vertical section of Fig. 2. Fig. 4 is a front view with the casing removed. Fig. 5 is a top plan view of a modified form of the apparatus. Fig. 6 is end view in elevation of the upper portion of the apparatus illustrated in Fig. 5. Fig. 7 is a similar view at right angles to Fig. 6. Fig. 8 is a side view of a portion of the device shown in Fig. 4, but modified in construction. Figs. 9, 10, 11, and 12 are side views of modified constructions of the weighing-bucket which forms a part or element of the apparatus.

In its general character and mode of operation the mechanism involving my present invention is similar to that of my patent referred to. It is an apparatus which is placed under a suitable bin or receptacle containing the substance that is to be weighed off and deposited in bags, cans, or boxes. By the manipulation of a hand-lever the substance is caused to descend through a chute or hopper into a weighing-bucket until the exact quantity which the apparatus has been adjusted to weigh has been received therein, whereupon by the movement of the bucket or scale-beam from which it is suspended an electric circuit is closed that sets in operation devices which effect the discharge of the contents of the bucket into a bag or box placed to receive them. The subsequent movement of the hand-lever prepares the bucket to receive another charge and restores the other parts of the apparatus to operative condition.

I refer now to the drawings for an explanation of so much of the apparatus as includes or is immediately connected with the present improvements.

A is a box or casing containing the weighing apparatus. This is placed under a bin, from which the substance to be weighed descends into a chamber or hopper B in the upper portion of the casing. Near the top of the said casing and in the hopper B is a grating formed by the series of transverse triangular bars C.

D is a perforated slide placed under the grating and supported by the lugs or guides $a\ a$, Figs. 1 and 4, the openings in the slide corresponding to those in the grating, so that a slight movement of the former will suffice to open or close all of the passages through which the substance descends into the weighing-bucket. A slide-bar D' is connected at D'' by a pivot-stud with said slide and is pivoted at its other end to the short arm of a bell-crank lever E, pivoted at E' to a plate E'' on the top of the casing A. An arm or lug F is secured to the slide D, and with a slot in said lug an arm F', extending from a rock-shaft F'', engages. The rock-shaft F'' is mounted in bearings $f\ f'$, secured to the top of the casing, and is actuated by a spiral spring G, one end of which is fixed to the bearing $f$ and the other to a collar $f''$, which is secured to the shaft after the spring has been moved up, so as to impart the necessary rotary movement to the said shaft. The tendency of the spring is to turn the rock-shaft F'' and arm F' in a direction to shift the slide D to the position in which it closes the openings between the bars C. This movement of the rock-shaft and slide is prevented by an electromagnetic trip or catch. (Shown in Figs. 1 and 2.)

H is a lever mounted to turn about a vertical axis in suitable supports or bearings on the plate E''. One end of said lever is formed as a catch, that normally engages the end of the long arm of the bell-crank lever E, and to the opposite end is secured the armature H' of an electromagnet H''. To insure engagement of the levers H and E, a flat spring $h$ is secured to the end of a lug $h'$ on the lever H and, extending radially from its pivotal axis, is maintained under tension by an adjustable stop $h''$, passing through a lug on the plate E''.

An inspection of the electric trip mechanism will show a special advantage that is gained by the construction and arrangement described. The two arms of the lever E are nearly at right angles, and the lever H and slide-bar D' are approximately parallel, so that the direction of pull of the slide-bar D' is so nearly in line with the pivotal support of the lever E and its one point of connection with such lever that the pressure between the engaging levers E and H is comparatively slight, and they are readily disengaged by the electromagnet. The magnet H'' is in the circuit of a battery I, which is normally interrupted, but which is momentarily closed when the scale-beam J is raised by the weight of the bucket and its contents, so as to touch an insulated adjustable contact-point I'. This closure of the circuit by energizing the magnet releases the lever E and permits the spring G to turn the rock-shaft F'' and close the slide. The lever E, however, carries a conducting-plate $i$, which normally bridges two contacts $i'$ $i'$ in the circuit of the magnet, so that as soon as the lever E is released the circuit is broken. By this means short-circuiting of the battery for any considerable period of time is prevented.

Referring now to Figs 2 and 4, it will be seen that the scale-beam J forms part of a bifucated lever resting on knife-edges $j$ at the sides of the casing. The weighing-bucket K is suspended from the short arms of the lever by knife-edge bearings $j'$, and the beam is provided with the sliding weight K' and the other usual accessories. The weights are adjusted and secured in position to effect the desired counterbalance.

As explained above, the tilting of the beam by the weighted bucket stops the supply of material, and in order that the bucket may then discharge its contents into the bag or other receptacle placed beneath the funnel L, I have devised the following means: The bottom of the weighing-bucket K is composed of two plates L' L'', secured to the hinge-bars $l$. To these bars, at one side of the bucket, are secured weighted arms $l'$ $l'$, which always act to turn and maintain the plates L' L'' in position to close the bottom of the bucket K. To the hinge-bars $l$ at the opposite side of the bucket are fixed arms M M, which, when the plates L' L'' have been turned so as to close the bucket, engage with catch-levers $m$ $m$, which are pivoted to the side of the bucket and are acted upon by springs $m'$ $m'$, that keep them in engagement with the arms M. These catches are tripped to release the arms M by the wedge-shaped end of a spring-actuated plunger M', arranged to slide through lugs $m''$ $m''$ on the side of the bucket, and said plunger is depressed again by the force of its spring M'', so as to spread the catch-levers by the device shown more particularly in Figs. 2 and 3. This consists of an L-shaped bar N, one end of which passes into the casing through a vertical slot at $n$ and the other through a slot in the flange or shelf A' at the top of the casing. A spring $n'$ bears on the bar N and acts to force it upward, and a spring $n''$, also bearing on the same, tends to force it over toward the rock-shaft F''. The lower end of the bar N carries an arm $o^3$, with a projection thereon that encounters and depresses the plunger M' when the bar N is forced downward, and the upper end lies under an arm O, extending from the rock-shaft F''. When the bucket has received its proper charge and the shaft F'' has been released by the electromagnetic trip, the movement of the said rock-shaft simultaneously with the cutting off of the supply of material to the bucket depresses the bar N and by the means above described releases the arms M, that keep the bottom of the bucket closed. The weight of the charge of material in the bucket swings the plates L' L'' away from the bottom of the bucket and the charge falls down through the funnel into the receptacle placed to receive it. The arc through which the end of the arm O travels carries it out of the path of the bar N, so that the latter is released and by the spring $n'$ raised to its normal position. By this means the catch-levers $m$ $m$ are reset in position to engage the arms M, which are swung up into engagement therewith as soon as the discharge of the contents of the bucket permits the weighted arms $l'$ $l'$ to close the plates L' L''. The bucket is then in readiness to receive another charge, and, for convenience, pointers O' are secured to the hinge-bars $l$ outside the casing to indicate the position of the plates or to show when the bucket is closed or open. A shield O'' in the form of an inverted V is placed in the bucket over the hinge-bars $l$ to divert the material from the same. To start the supply of material for a fresh charge and to reset the electromagnetic trip, a hand-lever P is jointed to the side of the casing and connected with the rock-shaft F'' by a crank-arm P' and a connecting-rod P''. By depressing the lever P the shaft F'' is turned until the slide D is opened and engaged by the electric catch and the arm O brought above the end of bar N.

The specific character of the weighing-bucket and the means for opening and closing the same may be considerably varied without departure from the spirit of the invention. For example, I have shown in Figs. 9 and 10 a modified form of this device. The bottom plates L' L" are hinged at the sides of the bucket and when closed are engaged by two catch-levers m m, which are forced out of engagement with the plates by a plunger M', similar to that above described, which forces apart the upper arms of said catch-levers against the force of a spiral spring p, which connects them. To the sides of the bucket are pivoted weighted arms p', which normally operate to raise and close the plates L' L". The weighted arms p' are secured to shafts which are connected together by a bar R', pivoted to crank-arms R", extending from said shafts. One of the shafts may be connected with the mechanism of a hand-lever, so as to be operated by the same to close the bucket when so desired.

Another form of bucket is shown in Figs. 11 and 12. In these figures the bottom of the bucket is composed of a single plate r, pivoted at one side and engaging with a latch r' at the opposite side of the bucket. A weighted arm r" acts to close the bottom plate when the contents of the bucket have been discharged.

In Fig. 8 a modified means of supporting the weighing-bucket from the scale-beam is shown, the figure being on a reduced scale. The weighing-bucket instead of being suspended from the end of the beam J is hung on the end of a lever o, pivoted at o'. The end of the lever o is connected to the scale-beam J by the hooks o", joined by a right and left hand screw-nut k, by means of which the levers are adjusted. This construction is desirable in machines of large capacity.

The apparatus as I have now described it is especially adapted for handling such substances as are classed by mill-men as "sharp" or "granular" and are not tenacious, like flour; but when such substances as will not readily feed into the weighing-bucket by gravity alone are to be weighed it is necessary to use some means for facilitating their precipitation. In such cases I employ the feeding devices illustrated in Figs. 5, 6, and 7. The electric trip mechanism in this device is the same as in the previous figures. The lever E, however, is connected by a pivoted link e with a rod T, which works through guides t t, secured to the top of the casing, and operates, through a connecting-link t' and a pivoted lever t", a friction or similar clutch T'. This clutch normally connects a shaft T" with a loose pulley V, which is constantly driven by a belt, and the rotary motion of said shaft imparts reciprocating motion to a screen V' in the chute or hopper through an eccentric V" on the shaft and a rod v, connecting the eccentric-strap with the said screen or sieve V'. In the chute, immediately above the reciprocating screen, are transverse bars of strap-iron Y, which prevent the material in the hopper or chute from oscillating with the screen. The rock-shaft F", with its actuating spiral spring G, is connected to the rod T by a link W, pivoted to the said rod, and to a crank-arm W' on said shaft, and when the electric trip is operated to release the rod T the shaft F" shifts the rod, disengages the clutch T', and stops the motion of the screen V'. The other end of the shaft F" also carries a crank-arm w', which is connected by a bar W" with the crank-arms w on three trap-doors X X X, placed in the chute beneath the screen V' and so arranged that when the shaft F" is permitted to turn these trap-doors or rotary plates, which are normally in vertical positions, are turned through angles of ninety degrees and close the chute.

The apparatus as above described enables me to weigh off given quantities of granular, powdered, or other substances with great accuracy and despatch and deposit the portions into any receptacles, such as paper and cloth bags, cans, or boxes.

What I claim as my invention is—

1. In an automatic weighing-machine, the combination with a scale and a weighing-bucket carried thereby, of a perforated slide, D, arranged to alternately register with and to close a series of openings through which the material is fed into the bucket, a spring-actuated rock-shaft, F"', connected with said slide for actuating it, a slide-bar, D', connected with the slide, a bell-crank lever, E, connected with the said slide-bar, a catch-lever, H, arranged to engage with and hold the bell-crank lever in position to maintain the said slide open, an electromagnet arranged to operate the said lever H, and an electric circuit, including said magnet, controlled by the movements of the scale, substantially as set forth.

2. In an automatic weighing-machine, the combination with a slide-bar controlling the feed cut-off, a pivoted bell-crank lever having one arm pivotally connected with the slide-bar and having its pivot very close to the line of movement of the said slide-bar, a latch or trip-lever parallel with the slide-bar and adapted to engage with the other arm of the bell-crank lever, a magnet in a circuit controlled by the movement of the scale-beam for releasing said latch or trip, and means for shifting the slide-bar when released by the magnet, as set forth.

3. In an automatic weighing-machine, the combination with a slide-bar controlling the feed cut-off, a bell-crank lever to one arm of which said bar is pivotally connected, a latch-lever adapted to engage with said bell-crank lever, a magnet in a circuit controlled by the scale-beam for releasing said latch, and a spring-actuated rock-shaft engaging the slide-bar, and adapted to shift the same when released by the magnet, as set forth.

4. In an automatic weighing-machine, the combination with a scale-beam, of a weighing-bucket suspended therefrom, one or more hinged plates forming the bottom of said bucket, weighted arms extending from said plates and operating to maintain the plates in position to close the bottom of the bucket, a latch engaging the plates when closed, a spring-actuated rock-shaft, an electromagnetic trip that normally prevents the movement of the same, and a bar adapted to be depressed by the movement of the rock-shaft when the latter is released, and to thereby disengage the latch from the bottom plates of the bucket, as set forth.

5. In an automatic weighing-machine the combination with the following instrumentalities located in the chute or hopper, a trap or device for shutting off the feed, an oscillating screen or sieve above the trap and a series of fixed plates above the screen for preventing transverse movement of the body of material above the screen, of mechanism controlled by the movement of a scale-beam for operating the trap and screen, as herein set forth.

EDWARD HANAK.

Witnesses:
EUGENE E. SMITH,
F. B. SMITH.